United States Patent
Chang

(10) Patent No.: US 7,874,684 B2
(45) Date of Patent: Jan. 25, 2011

(54) HOUSING ASSEMBLY AND PROJECTION DEVICE HAVING THE SAME

(75) Inventor: Hsiu-Ming Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 527 days.

(21) Appl. No.: 12/043,180

(22) Filed: Mar. 6, 2008

(65) Prior Publication Data

US 2009/0002642 A1  Jan. 1, 2009

(30) Foreign Application Priority Data

Jun. 29, 2007  (TW)  ................................ 96123833 A

(51) Int. Cl.
*G03B 21/14* (2006.01)
*H04N 5/64* (2006.01)
*E05D 3/06* (2006.01)

(52) U.S. Cl. ........................ 353/119; 353/122; 348/789; 348/836; 16/366

(58) Field of Classification Search .................. 353/119, 353/122; 348/787, 789, 794, 836; 16/366; 49/246

See application file for complete search history.

(56) References Cited

U.S. PATENT DOCUMENTS

| | | | |
|---|---|---|---|
| 6,698,899 B2 | | 3/2004 | Yamada et al. |
| 6,981,770 B2 * | | 1/2006 | Murai et al. ................... 353/61 |
| 2004/0141155 A1 * | | 7/2004 | Wang et al. .................... 353/61 |
| 2007/0211220 A1 * | | 9/2007 | Kaneko ......................... 353/52 |

FOREIGN PATENT DOCUMENTS

| | | |
|---|---|---|
| CN | 1344968 | 4/2002 |
| CN | 2632992 Y | 8/2004 |
| JP | 2002244213 A  * | 8/2002 |

OTHER PUBLICATIONS

May 17, 2009 Chinese Office Action from related case CN2007101227826. English summary attached.
Chinese Office Action from corresponding Chinese Application No. 200710122782.6 dated Feb. 11, 2010. English machine translation attached.

* cited by examiner

*Primary Examiner*—Georgia Y Epps
*Assistant Examiner*—Magda Cruz
(74) *Attorney, Agent, or Firm*—Grossman, Tucker, Perreault & Pfleger, PLLC

(57) ABSTRACT

A housing assembly which comprises a primary housing, a secondary housing and a moving mechanism is provided. The primary housing has a first external contour and an opening disposed on the primary housing. The secondary housing has a second external contour. The moving mechanism connects the secondary housing to the primary housing so that the secondary housing can move between the sheltering position and the open position. When the secondary housing is located in the open position, the primary housing can define a space within the secondary housing. When the secondary housing is located in the sheltering position, the secondary housing is adapted to at least partially cover the opening. The first external contour and the second external contour together form a third external contour, which has substantially the same or different contour as the first external contour.

24 Claims, 7 Drawing Sheets

HOUSING ASSEMBLY AND PROJECTION DEVICE HAVING THE SAME

This application claims priority to Taiwan Patent Application No. 096123833 filed on Jun. 29, 2007, the disclosures of which are incorporated herein by reference in their entirety.

CROSS-REFERENCES TO RELATED APPLICATIONS

Not applicable.

BACKGROUND OF THE INVENTION

1. Field of the Invention

The present invention relates to a housing assembly, and more particularly, relates to a movable housing assembly for use in a projection device.

2. Descriptions of the Related Art

In various household appliance products currently available, a housing structure is usually used to accommodate and integrate various electronic components therein. For example, electromechanical apparatuses such as computers, projection devices or the like are equipped with respective housing structures with different configurations.

As shown in FIG. 1A, a housing structure commonly used in a current electromechanical apparatus is depicted. The housing structure has a plurality of openings for placing a cooling fan inside the apparatus so that heat generated by the electromechanical apparatus may be dissipated outwards therethrough (as indicated by the arrow in this figure). Additionally, to prevent foreign matters such as dust, paper scraps, defoliations, detritus or the like from entering the electromechanical apparatus and consequently causing damage to various components therein, tiny openings are designed in a honeycomb-like form to allow heat to dissipate as well as block foreign matters.

In addition, the user typically operates the projection device in dark surroundings to obtain better imaging. Accordingly, the device must be able to prevent light from leaking out of the projection device during operation. If the housing structure had a poor light sheltering function, light within the projection device would leak outwards from the housing structure, which would adversely impact the imaging effect when operating in dark surroundings. In view of this, a number of light screens are disposed on the conventional housing structure at external locations corresponding to these openings to enhance the functions of blocking foreign matter and preventing light leakage.

As shown in FIG. 1B, prior art light screens for use in a projection apparatus are depicted. The light screen has a shutter-like structure for blocking foreign matters and preventing light leakage. However, since such light screens are fixed, and therefore are unable to close, it is still possible for foreign matters to enter the housing structure via the space between the light screens and the openings. As a result, when the projection device is turned on, damage may occur in the device. Furthermore, even though some of the movable light screens that are used in the prior art for closing the openings may be turned off, no linkage mechanism is provided for closing all the screens simultaneously. Thus, the user must close all the openings of the housing structure by closing each of the whole moveable screens individually after the projection device is turned off. This above-mentioned procedure is very inconvenient and time consuming. Furthermore, if the movable light screens are designed improperly, the air flow from dissipated heat would result in a violent turbulence inside the housing structure and the movable light screens. As a result, there would be excessive noise and over time, the quality of the projection device is degraded.

In conclusion, the conventional housing structures for use in a projection device fail to provide the functions of blocking foreign matters, preventing light leakage and dissipate heat simultaneously. For example, if the number of light screens is increased or the distance between the light screens and the housing structure is shortened in an attempt to enhance the functions of blocking foreign matters and preventing light leakage, flow resistance for heat dissipation will be increased, leading to a poor heat dissipation and noise due to turbulence. Moreover, the light screen structures commonly used at present lack aesthetical designs. Therefore, efforts still have to be made in the art to provide a housing structure that can block foreign matters, prevent light leakage and dissipate heat, as well as provide an aesthetical appearance.

SUMMARY OF THE INVENTION

One objective of this invention is to provide a housing assembly for use in an electromechanical apparatus to facilitate the heat dissipation from the apparatus, block foreign matters, reduce noise caused by the exhausted hot air flow and the like.

To this end, an embodiment of a housing assembly is provided in this invention. The housing assembly comprises a primary housing, a secondary housing and a moving mechanism. The primary housing has a first external contour and an opening formed on the primary housing. The secondary housing has a second external contour. The moving mechanism connects the secondary housing to the primary housing so that the secondary housing is adapted to move between a sheltering position and the open position relative to the primary housing. When the secondary housing moves to the open position, the primary housing defines a space within the secondary housing. When the secondary housing moves to the sheltering position, the secondary housing is adapted to at least partially cover the opening. The first external contour and the second external contour both form the third external contour which is substantially the same as or different from the first external contour.

Another objective of this invention is to provide a projection device with a movable housing assembly, which can dissipate heat, block foreign matters, reduce noise caused by the exhausted hot air flow and prevent light leakage. The projection device also has an aesthetical appearance.

To this end, an embodiment of a projection device is provided in this invention. The projection device comprises a housing assembly and a cooling assembly. The housing assembly includes a primary housing, a secondary housing and a moving mechanism. In more detail, the primary housing has a first external contour and an opening formed on the primary housing. The secondary housing has a second external contour. The moving mechanism connects the secondary housing to the primary housing, so that the secondary housing is adapted to move between the sheltering position and the open position relative to the primary housing. When the secondary housing moves to the open position, the primary housing defines a space within the secondary housing. The cooling assembly is disposed in the primary housing and adapted to dissipate heat generated by the projection device outwards through the opening and the space.

The detailed technology and preferred embodiments implemented for the subject invention are described in the

DESCRIPTION OF THE PREFERRED EMBODIMENT

This invention provides a housing assembly for use in an electromechanical apparatus that has high temperatures and is sensitive to dust. It should be noted that the housing assembly disclosed in this invention is not limited to the application in a projection device; appropriate alterations or modifications may be made by those skilled in the art upon understanding the spirit and principle of this invention. Therefore, all these alterations and modifications shall be considered to fall within the scope of the claims set forth in this invention.

Figure 1A:
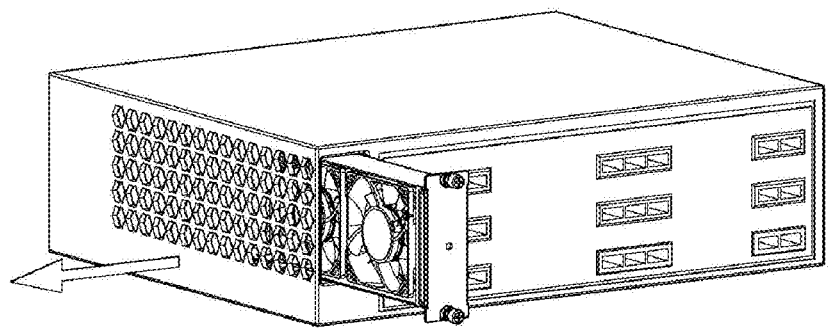
FIG. 1A illustrates a housing structure in a conventional electromechanical apparatus.
Figure 1B:
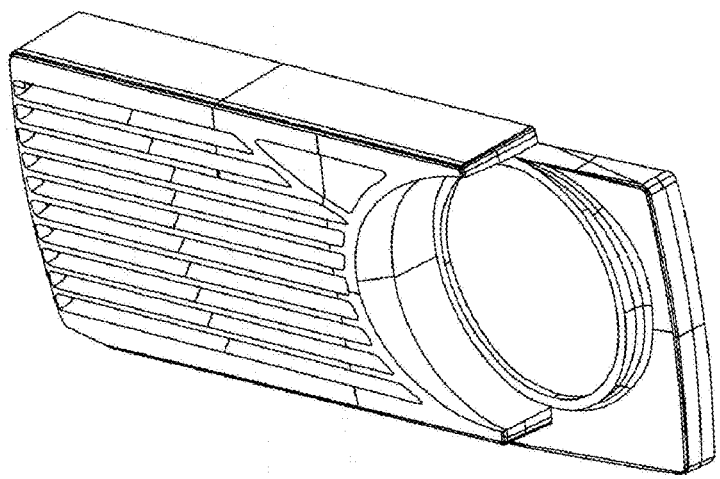
FIG. 1B illustrates a housing structure in a conventional projection device.
Figure 2A:
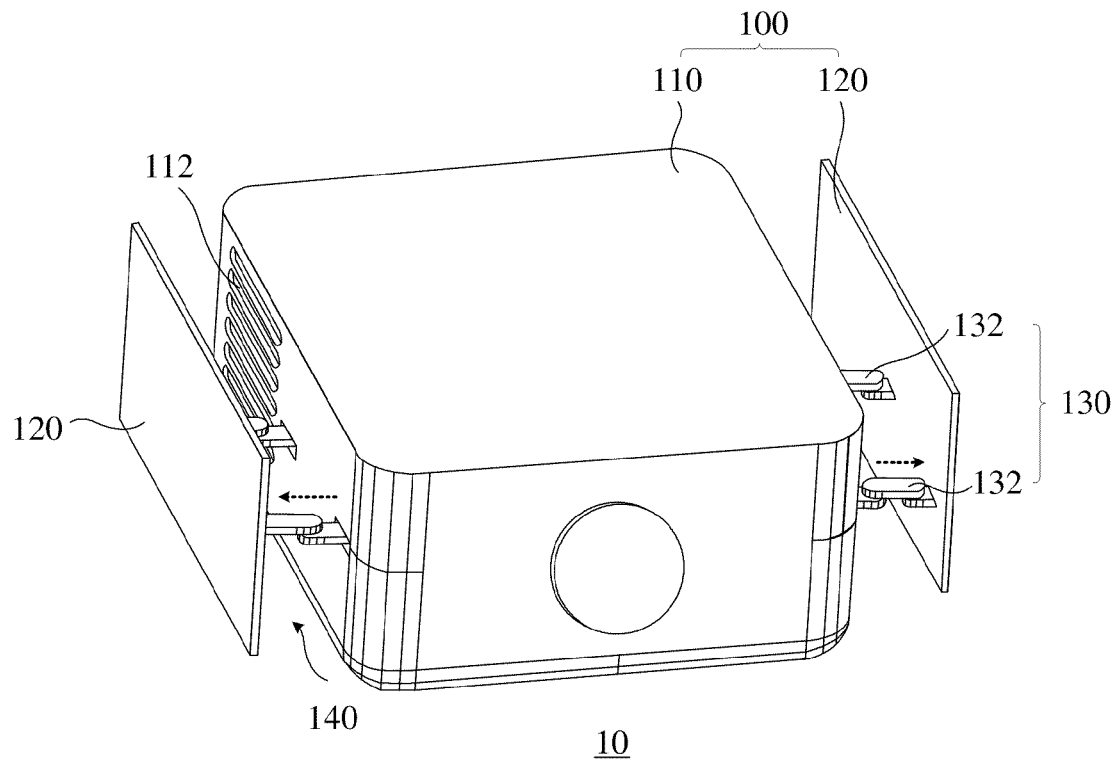
FIGS. 2A, 2B, 3A, 3B, 4A and 4B illustrate housing assemblies of this invention when used in a projection device respectively.

FIG. 2A illustrates an embodiment of the projection device using the housing assembly of this invention. Since this projection device is substantially the same as the prior art projection device in view of components and functions thereof, only the technical features of the housing assembly of this invention will be described hereinafter for simplicity. The projection device 10 depicted in FIG. 2A comprises a housing assembly 100, a light source (not shown) and a cooling assembly (not shown) disposed inside the housing assembly 100. The light source provides luminance for the image projection, while the cooling assembly is adapted to dissipate heat generated during the operation of the projection device 10.

In more detail, the housing assembly 100 of this invention for use in the projection device 10 comprises a primary housing 110, two secondary housings 120 and two moving mechanisms 130 (e.g., pivoting mechanisms 132) cooperating with the two secondary housings 120. The primary housing 110, which mainly serves as the housing structure of the projection device 10, comprises a plurality of side walls surrounding the four sides as well as the top and the bottom thereof to define a receiving space for accommodating various key components of the projection device. Additionally, two openings 112 are arranged at appropriate locations on the primary housing 110 so that an airflow passage for heat dissipation is formed between these openings 112 and the cooling assembly.

Furthermore, the secondary housings 120 are disposed outside the primary housing 110 at locations corresponding to the openings 112. For example, as shown on the left side of FIG. 2A, a moving mechanism 130 is disposed for connection between the primary housing 110 and the secondary housing 120. The secondary housing 120 may move between the open position (the position occupied by the secondary housing 120 in FIG. 2A) and the sheltering position (the position occupied by the secondary housing 120 in FIG. 2B). In more detail, to overcome various disadvantages of the prior art, the primary housing 110 is formed with a first external contour, while the secondary housing 120 is formed with a second external contour. When the secondary housing 120 moves to the open position, the primary housing 110 cooperates with the secondary housing 120 to define a space 140 therebetween so that heat generated by the operation of the projection device 10 can be dissipated outwards by the cooling assembly through the opening 112 and the space 140. On the other hand, when the secondary housing 120 moves to the sheltering position, the secondary housing 120 is adapted to selectively cover the opening 112 partially or entirely. At this point, the first external contour of the primary housing 110 and the second external contour of the secondary housing 120 cooperatively form a third external contour.

FIGS. 2A, 2B, 3A, 3B, 4A and 4B together illustrate several embodiments of the first external contour of the primary housing 110 and the second external contour of the secondary housings 120. Unlike the shutter-like structure in the prior art as mentioned above, the secondary housings 120 depicted in these figures have a single unitary structure which at least partially covers the opening 112. Depending on particular requirements, the second external contour of the single unitary structure may be combined with the first external contour when the secondary housing 120 moves to the sheltering position. Accordingly a third external contour which is substantially the same as or different from the first external contour is obtained.

Figure 2B:
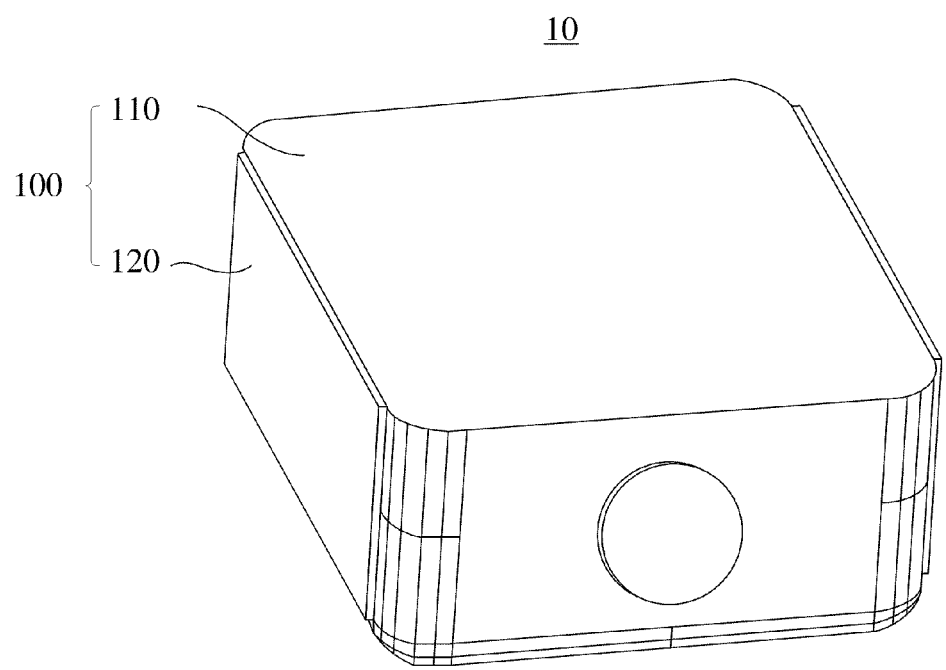

For example, in FIGS. 2A and 2B, the primary housing 110 of the projection device 10 has a first external contour that is cuboidal shaped, which has two opposite side walls on which the two openings 112 are formed respectively. The projection device 10 has two secondary housings 120 with a second external contour in a rectangular board shape. The third external contour cooperatively formed by the first and the second external contours is substantially the same as the first external contour, and such a secondary housing structure is called a single unitary structure hereinafter.

When moving to the sheltering position under the actuation of the moving mechanisms 130, the secondary housings 120 are adapted to completely cover the two openings 112. As a result, when the projection device 10 is turned off, all openings communicating with the outside could be substantially closed. Accordingly, foreign matters are blocked from entering the projection device 10 and the aesthetical appearance of the projection device 10 is substantially improved as well. On the other hand, once the projection device 10 starts to operate, the secondary housings 120 could be moved to the open position under actuation of the moving mechanisms 130, in which case two appropriate spaces 140 formed between the respective secondary housings 120 and the primary housing 110 are adapted to dissipate heat and to block foreign matters.

Particularly, when scattered light emitted from the internal light source disposed in the primary housing 110 leaks out of the opening 112, the secondary housings 120 of a single unitary structure will readily block the light so that the audience will not notice the internal scattered light which would otherwise impact the imaging effect of the projection device when operating in dark surroundings. By replacing the prior art partitioning shutters with the secondary housings 120 of a single unitary structure, the heat dissipation efficiency and the noise disturbance of the projection device can be significantly improved.

Figure 3A:
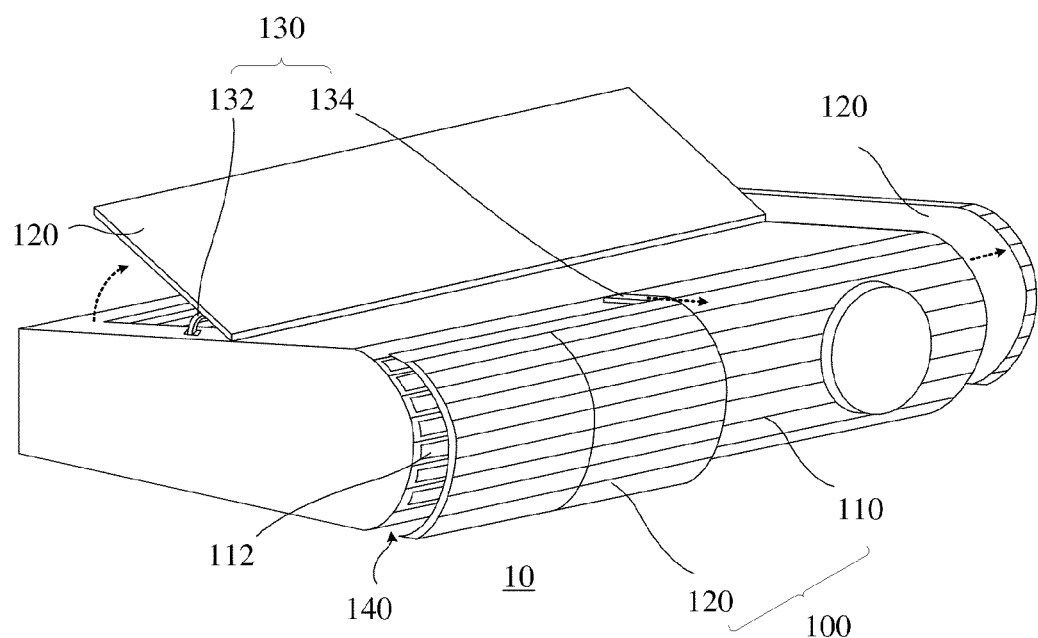
Figure 3B:
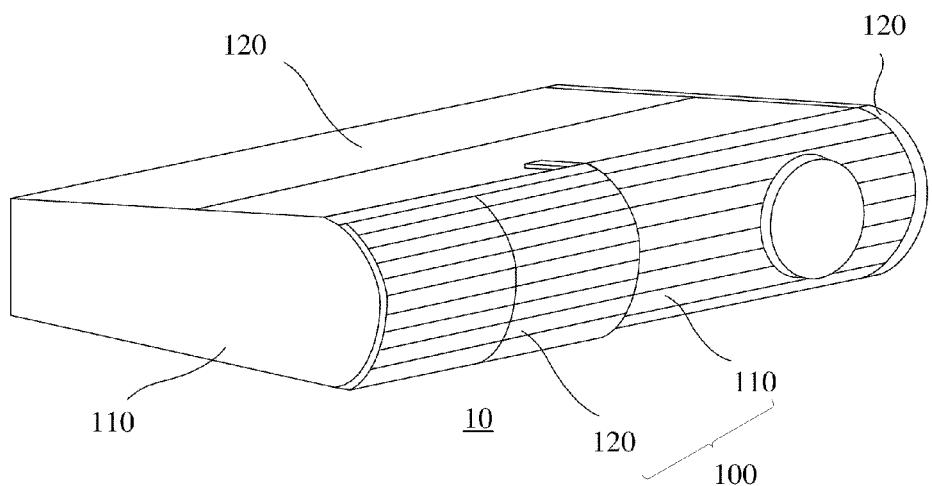

FIGS. 3A and 3B illustrate the primary housing 110 of the projection device 10 with a first external contour that is trapezoid-cuboidal shaped. In more detail, the primary housing 110 has a top, two opposite side walls, a front edge and three openings. The three openings are disposed on the top, the front edge and one of the side walls respectively. The projection device 10 of this embodiment has three secondary housings 120. The second external contour of the three secondary housings 120 is at least substantially the same as the first external contour of the primary housing 110 so that the third external contour formed by combining the second contours and the first contour is substantially the same as the first external contour. Consequently, when moved to the sheltering position, the three secondary housings 120 are adapted to cover these openings completely. Similarly, when the projection device 10 starts to operate, the secondary housings 120 will be moved to the open position to dissipate heat, blocking foreign matters and prevent light leakage.

Figure 4A:
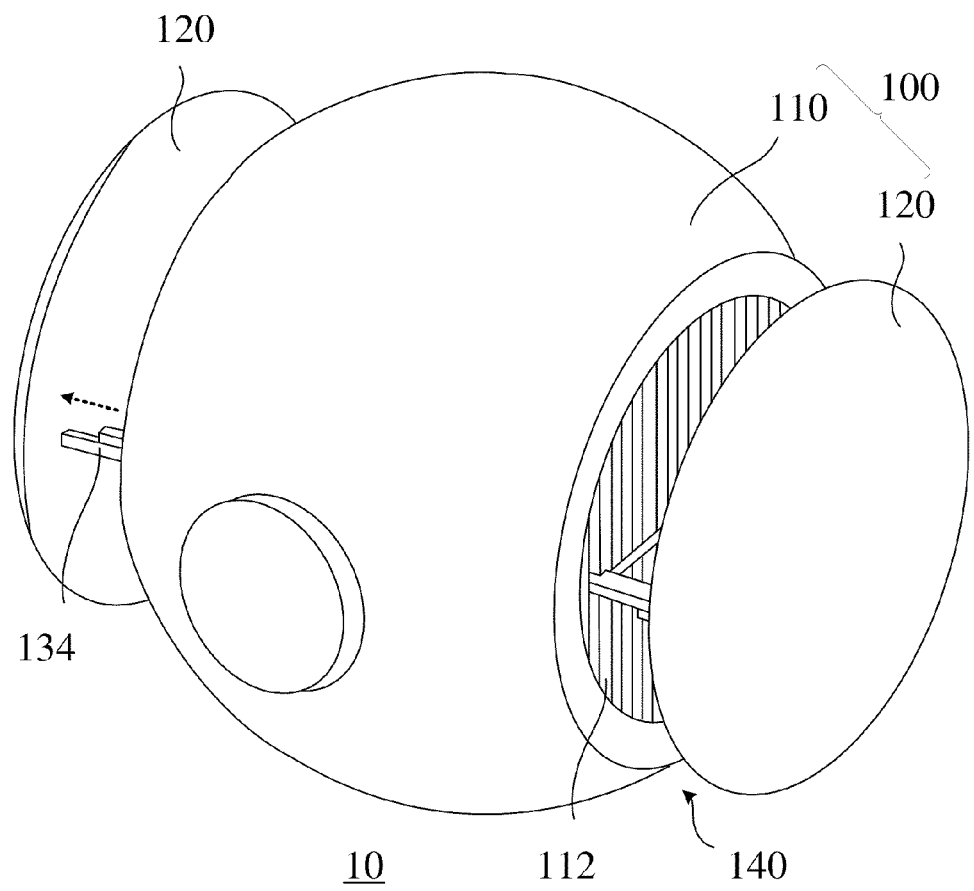
Figure 4B:
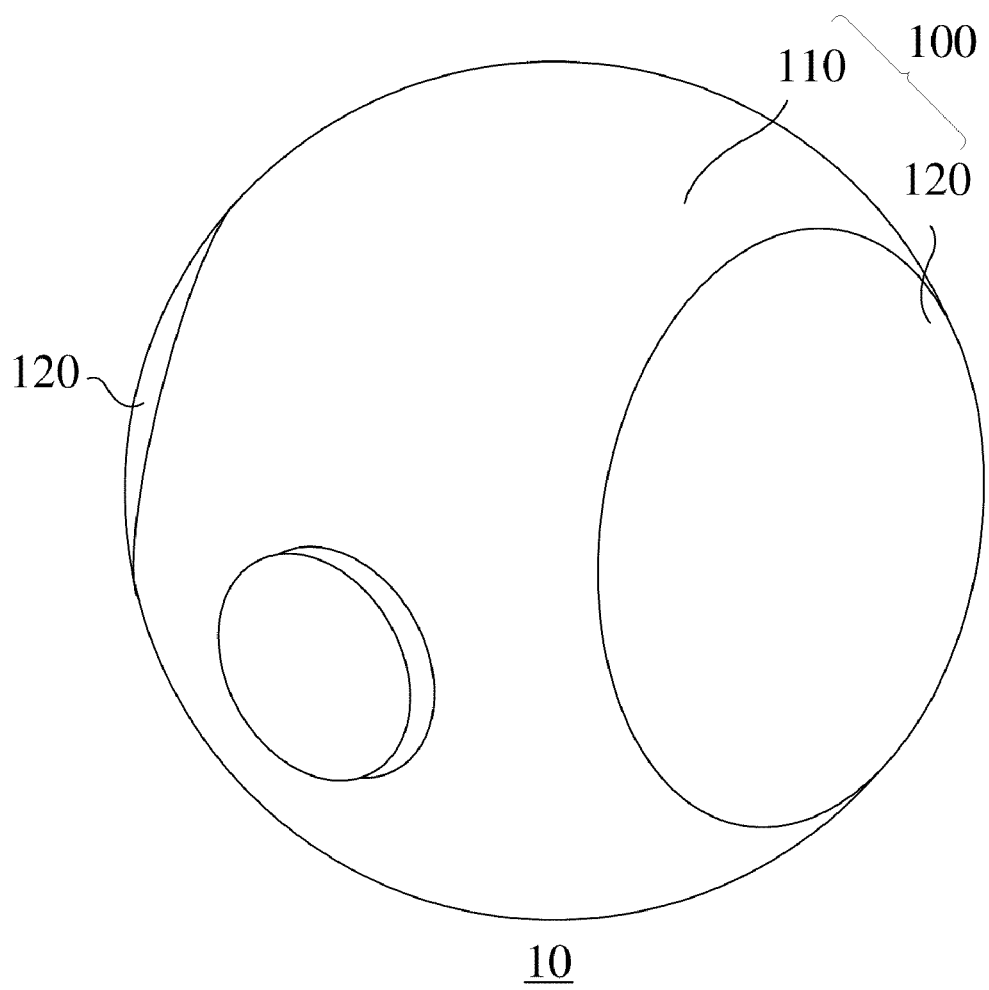

FIGS. 4A and 4B illustrate similar embodiments to the previous embodiment except that the external contour of the projection device is different. In this embodiment, the primary housing 110 of the projection device 10 has two opposite side walls and two openings 112 disposed on the two opposite side walls. The first external contour is spherical in shape with two truncated sides. Additionally, the projection device 10 of this embodiment further has two secondary housings 120 with a second external contour, which is a round shape. When combing the first external contour of the primary housing 110 and the second external contour of the secondary housings 120, a spherical structure is formed which is substantially different from the first external contour. By varying the external contours of the secondary housings, this invention can provide a projection device with an improved aesthetical appearance, and solve problems of the conventional projection devices, such as poor heat dissipation, foreign matter incursion, light leakage and excessive noise.

Moreover, in the preferred embodiment of this invention, the moving mechanism 130 is a pivoting mechanism 132, a linkage mechanism 134 or the like. Depending on the practical requirements, the moving mechanism 130 is disposed on the appropriate side edge of the secondary housing 120, for example, the top, the two opposite side walls, a front edge of the secondary housing 120 or the like so that the secondary housing 120 may be manually or electrically pivoted or shifted between the sheltering position and the open position under actuation of the pivoting mechanism 132 or the linkage mechanism 134, as shown by the arrows depicted in FIGS. 2A, 3A and 4A. It is noted that the moving mechanisms 130 described above are only for understanding this invention, and other suitable moving mechanisms may also be applied.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A housing assembly, comprising:
   a primary housing, having a first external contour and an opening formed on the primary housing;
   a secondary housing, having a second external contour; and
   a moving mechanism, connecting the secondary housing to the primary housing so that the secondary housing is adapted to move between a sheltering position and an open position, relative to the primary housing; wherein when the secondary housing moves to the open position, the primary housing defines a space with the secondary housing and when the secondary housing moves to the sheltering position, the secondary housing is adapted to at least partially cover the opening, and wherein the first external contour and the second external contour are in combination to form a third external contour.

2. The housing assembly of claim 1, wherein the primary housing includes a side wall, the opening is disposed on the side wall, and the secondary housing is adapted to completely cover the opening when the secondary housing is located in the sheltering position.

3. The housing assembly of claim 1, wherein the primary housing includes a top, the opening is formed on the top, and the secondary housing is adapted to completely cover the opening when the secondary housing is located in the sheltering position.

4. The housing assembly of claim 1, wherein the primary housing further comprises another opening and the housing assembly further comprises another secondary housing, and wherein the primary housing includes two opposite side walls on which the two openings are formed, respectively, and the two secondary housings are adapted to completely cover the two openings, respectively, when both of the secondary housings are located in their respective sheltering positions.

5. The housing assembly of claim 1, wherein the primary housing further comprises another opening and the housing assembly further comprises another secondary housing, and wherein the primary housing includes a side wall and a top, the two openings are formed on the side wall and the top, respectively, and the two secondary housings are adapted to completely cover the two openings, respectively, when the secondary housings are located in their respective sheltering positions.

6. The housing assembly of claim 1, wherein the moving mechanism is a pivoting mechanism, disposed on a side edge of the secondary housing so that the secondary housing is adapted to move pivotally between the sheltering position and the open position.

7. The housing assembly of claim 1, wherein the moving mechanism is a linkage mechanism, disposed on a side edge of the secondary housing so that the secondary housing is adapted to shift in a linear displacement between the sheltering position and the open position.

8. The housing assembly of claim 1, wherein the moving mechanism electrically moves the secondary housing.

9. The housing assembly of claim 1, wherein the moving mechanism manually moves the secondary housing.

10. The housing assembly of claim 1, wherein the first external contour is substantially the same as the third external contour.

11. The housing assembly of claim 1, wherein the first external contour is substantially different from the third external contour.

12. A projection device, comprising:
    a housing assembly, including:
       a primary housing, having an opening formed on the primary housing;
       a secondary housing, adapted to at least partially cover the opening when the secondary housing is located in a sheltering position; and
       a moving mechanism, connecting the secondary housing to the primary housing so that the secondary housing is adapted to move between the sheltering position and an open position, relative to the primary housing; wherein when the secondary housing moves to the open position, the primary housing defines a space with the secondary housing; and
    a cooling assembly, disposed in the primary housing, adapted to dissipate heat generated by the projection device outward through the opening and the space.

13. The projection device of claim 12, further comprising a light source disposed within the primary housing, wherein the secondary housing is adapted to block scattered light emitted from the light source via the opening when the secondary housing is located in the open position.

14. The projection device of claim 12, wherein the primary housing has a first external contour and the secondary housing has a second external contour, and wherein the first external contour and the second external contour are in combination to form a third external contour when the secondary housing is located in the sheltering position.

15. The projection device of claim 12, wherein the primary housing includes a side wall, the opening is disposed on the side wall, and the secondary housing is adapted to completely cover the opening.

16. The projection device of claim 12, wherein the primary housing includes a top, the opening is formed on the top, and the secondary housing is adapted to completely cover the opening.

17. The projection device of claim 12, wherein the primary housing further comprises another opening and the housing assembly further comprises another secondary housing, and wherein the primary housing includes two opposite side walls on which, the two openings are formed respectively, and the two secondary housing are adapted to completely cover the openings.

18. The projection device of claim 12, wherein the primary housing further comprises another opening and the housing assembly further comprises another secondary housing, and wherein the primary housing includes a side wall and a top, the two openings are formed on the side wall and the top, respectively, and the two secondary housing are located in their respective sheltering positions.

19. The projection device of claim 12, wherein the moving mechanism is a pivoting mechanism, disposed on a side edge of the secondary housing so that the secondary housing is adapted to move pivotally between the sheltering position and the open position.

20. The projection device of claim 12, wherein the moving mechanism is a linkage mechanism, disposed on a side edge of the secondary housing so that the secondary housing is adapted to shift in a linear displacement between the sheltering position and the open position.

21. The projection device of claim 12, wherein the moving mechanism electrically moves the secondary housing.

22. The projection device of claim 12, wherein the moving mechanism manually moves the secondary housing.

23. The projection device of claim 12, wherein the first external contour is substantially the same as the third external contour.

24. The projection device of claim 12, wherein the first external contour is substantially different from the third external contour.

* * * * *